Nov. 30, 1965    W. A. DICKSON    3,220,693
SLURRY THROTTLE VALVE
Filed May 31, 1961

INVENTOR.
WILLIAM A. DICKSON
BY Stanley J Price
HIS ATTORNEY

United States Patent Office

3,220,693
Patented Nov. 30, 1965

3,220,693
SLURRY THROTTLE VALVE
William Alan Dickson, Timberlake, Ohio, assignor to Dickson Corporation, Mentor, Ohio, a corporation of Ohio
Filed May 31, 1961, Ser. No. 113,944
1 Claim. (Cl. 251—122)

This invention relates to valves, and more particularly to a valve designed to throttle a liquid slurry of particulate material flowing through a pipeline.

In throttling flowing streams of a slurry of particulate material suspended in a liquid, severe problems of erosion and corosion are encountered by valves. These problems are many times more severe than the problems of erosion and corrosion which occur in throttling a stream of a homogeneous fluid such as clean liquid or gas. The present invention is directed to a novel throttling valve which is particularly adapted to be utilized in the severe erosive and corrosive environment encountered in throttling a slurry of particulate material.

The present invention will be described in connection with its use for throttling a stream of a coal-water slurry in which particles of coal are suspended in water for transportation of the coal through a pipeline. This example is for descriptive purposes only, and it will be appreciated that the valve of the instant invention is equally applicable to other slurry throttling applications such as mud line service in oil well drilling or the like. The valve may also be effectively utilized to throttle a stream of particulate material carried pneumatically in compresesd air or a similar gas traveling at high velocity through a pipeline, or even for throttling a stream of clean liquid or gas so as to reduce its abrasive action on the valve body.

In recent years a water slurry of particulate coal has been utilized to transport the particulate coal in many instances. Within coal preparation plants, coal slurries are effectively pumped to move particulate coal from one location to another. These coal slurries must be throttled and controlled so that the rate of coal delivery to a specified point does not exceed the capacity of the unit at that point to handle the incoming coal. In order to throttle the flow of the coal-water slurry and thereby control its flow rate, conventional gate valves and plug valves were utilized in the coal pipeline. These conventional gate and plug valves had an extremely short life span due to the erosive and corrosive effect of the slurry on the valves. Because the particulate material within the slurry was carried at a relatively high velocity, it impinged upon the parts of the valve with high erosive force and caused degradation of the valve components. Likewise, a mixture of coal and water is usually acidic so that a high rate of corrosion occurred on the metal parts of the valve.

While it was found that there was extreme corrosion and erosion of the valve seats and the valve gates or plugs in conventional valves utilized to throttle a coal-water slurry, the most extreme corrosive and erosive effect caused degradation of the valve body itself. Due to the relatively high velocity of the coal slurry and the change in flow rate at the throttling valve, the high velocity slurry attacked the valve body itself and soon required replacement of the entire valve body. As a result of this attack, it was found that in extreme situations within coal preparation plants, valves had to be replaced on the average of once every twenty-one days. This frequent replacement of valves resulted in exorbitant maintenance costs for the coal preparation plant.

The valve of the present invention has, to a great extent, overcome the foregoing disadvantages of conventional gate and plug valves when utilized for slurry throttling service. The valve of the present invention has an enlarged valve body for receiving the slurry material after it has been subjected to throttling action and wherein the velocity of the slurry is greatly reduced at which time the slurry material produces a surprising degree of reduction in the abrasive effect on the vavle body. Accordingly, the life of the body has been significantly increased. In order to more economically form the valve body of the present invention, it is fabricated from sheet metal secured together by welding. This fabricated sheet metal body has an improved valve body life and is more economical in construction.

In addition to providing a valve body with longer life, the valve of the present invention has a readily replaceable valve seat and valve throttling plug. Since the life of the valve body has been extended, the valve seats and the valve plug may now be replaced without removing the valve body from the line so that overall maintenance of the valve is significantly reduced.

The valve body of the present invention is constructed in such a way that a valve seat and valve plug are readily replaceable within the valve body without removing the valve body from the pipeline. This ready replacement of the valve plug and valve seat significantly increases the utility of the valve and slurry throttling applications. In a test installation of the valve at a location within a coal preparation plant in which conventional plug and gate valves had an average life of only twenty-one days, the valve of the present invention remained in the line for substantially longer periods with the only maintenance being replacement of the valve seat and valve plug.

The present invention, as will be seen from a description of the structure, embodies a process for regulating the flow rate and velocity of an abrasive slurry medium in which the slurry is first passed through a metering orifice of controllable cross section, at which time the slurry flow rate is established. The slurry material, after being regulated in flow rate, is then expanded into a chamber having a cross sectional area and capacity sufficient to cause a reduction in the velocity to such a degree that the abrasiveness of the slurry is reduced substantially below any comparable levels in prior art methods of handling such abrasive slurry flows. The slurry is then withdrawn from the enlarged chamber through a passage having a smaller cross section and wherein the linear veloicty of the slurry is increased to a rate in accordance with that established by the metering orifice.

With the foregoing considerations in mind, it is a primary object of the present invention to provide an improved slurry throttling valve.

Another object of this invention is to provide a throttling valve with a readily replaceable valve seat and a readily replaceable valve plug.

Another object of this invention is to provide a throttling valve having a fabricated sheet metal valve body.

Another object of this invention is to provide a valve in which body wear is reduced to a minimum.

Another object of this invention is to provide a method for regulating the flow of slurry material having corrosive and erosive properties in which the material is so subjected to throttling action, followed by a substantial reduction in velocity, and then followed by partial restoration of velocity, that the erosive and abrasive properties of the slurry material are greatly mitigated. Consequently the structure for practicing the method is usable over longer periods without necessitating service or replacement.

These and other objects of this invention will become apparent as this description proceeds in conjunction with the accompanying drawings.

Figure 1:
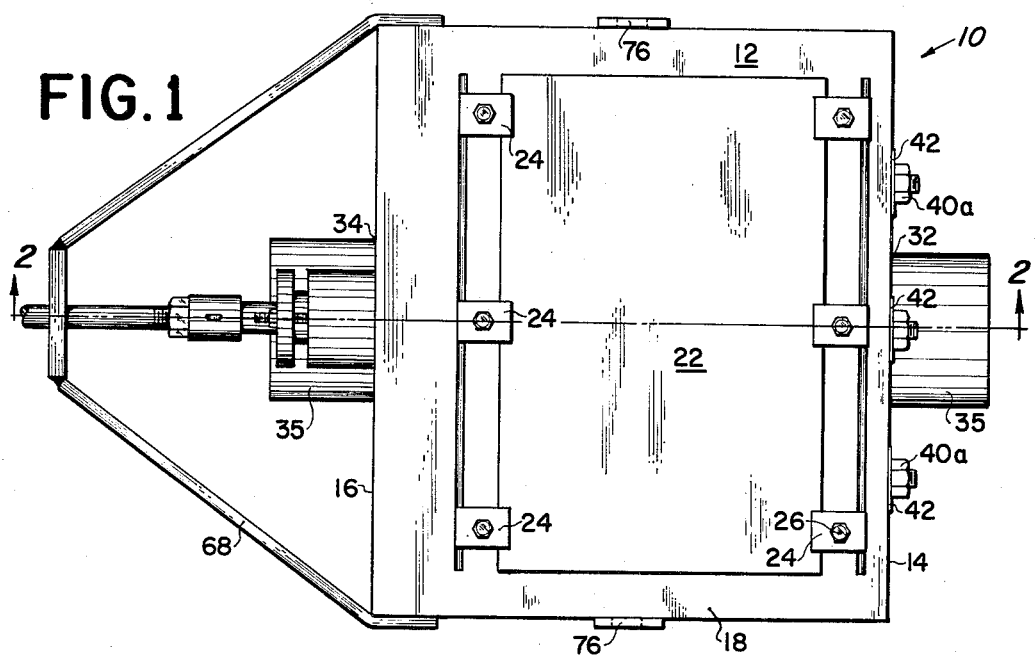
FIGURE 1 is a top plan view of the valve of the present invention.
Figure 2:
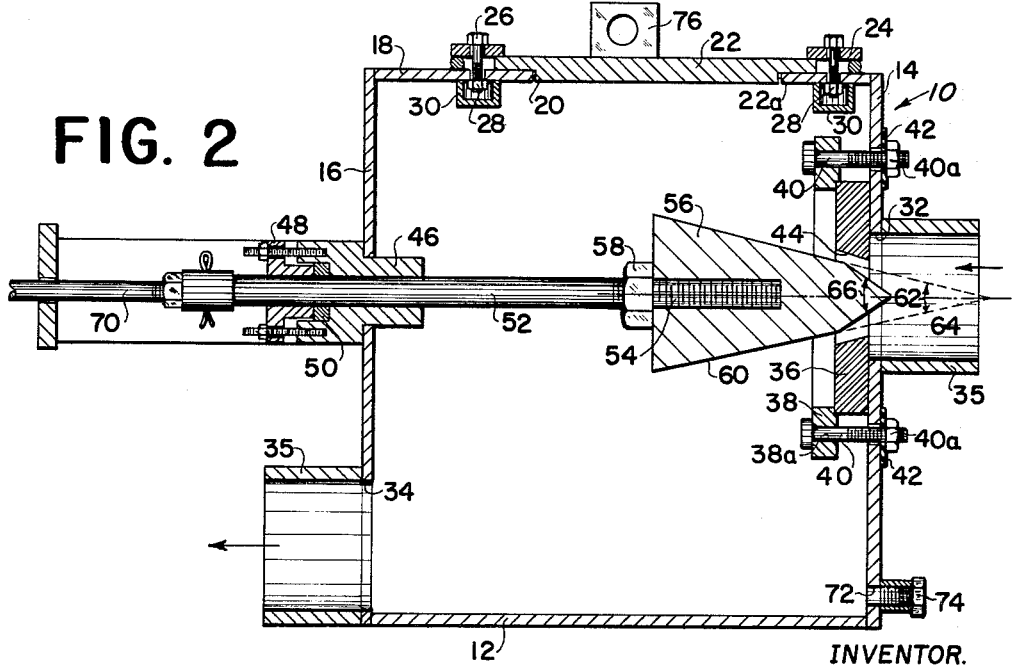
FIGURE 2 is an elevational view in vertical section taken along line 2—2 of FIGURE 1.

Referring to FIGURES 1 and 2, a valve 10 has a valve body 12 fabricated from sheet metal welded together in substantially the form of a cube, although the valve body could also be formed as a cylinder having an internal diameter. As shown in FIGURES 1 and 2, the valve body 12 is not precisely a cube since it is slightly shorter in axial length than in its height and width. The cross sectional area and capacity of the valve body 12 is established as a function of the velocity requirements for the material which passes through the body since the abrasive effect of the material is related to the flow velocity. Thus, generally speaking for any fluid, as its flow velocity is increased so also must the size of the body 12 be increased.

The valve body 12 has a first or front wall 14 and a second or rear wall 16 which are disposed in parallel spaced relation to each other. A third or top wall 18 connects the front and rear walls 14 and 16 respectively at the top of the valve body.

The third wall 18 has a rectangular access port 20 formed therein. Access port 20 is sealingly closed by a valve cover 22 which extends over the edges of the access port 20 and has a portion 22a which extends down into the access port 20 to accurately locate the cover 22 relative to the port 20. A plurality of lugs 24 are provided to secure the cover 22 to the valve body third wall 18. Lugs 24 are secured to the third wall 18 by bolts 26 which are threaded into nuts 28 welded to the underside of the top wall 18. The nuts 28 have pipe caps 30 welded to the top wall of the valve body in overlying relation to the nuts 28 to prevent leakage of fluid along the threads of bolts 26.

A circular inlet port 32 is formed in the valve body first wall 14 and a circular outlet port 34 is formed in the valve body second wall 16. Coupling pipes 35 are secured to the valve body at inlet port 32 and outlet port 34. The inlet port 32 and outlet port 34 are each formed in the same vertical plane as may be seen in FIGURE 1, but they are in different horizontal planes as is clearly shown in FIGURE 2 so that inlet port 32 and outlet port 34 are axially offset from each other.

An annular valve seat 36 is secured to the interior surface of first wall 14 to encircle the valve inlet port 32. Valve seat 36 is maintained in position by a clamping ring 38 which has a series of holes 38a formed therein. Bolts 40 pass through the holes 38a in the clamping ring and bolt the clamping ring to the valve body first wall 14. Nuts 40a are threaded onto the bolts 40 exteriorly of wall 14 and have gaskets 42 associated therewith to prevent leakage of fluid through the front wall 14.

The annular valve seat 36 is maintained in position surrounding the valve inlet port 32 so that a conical internal surface 44 formed on the valve seat has its smaller diameter adjacent the inlet port 32 and its larger diameter adjacent the interior of the valve body 12. A combination packing gland body and bushing 46 is sealingly secured within the valve body second wall 16 in axial alignment with the valve inlet port 32. The packing gland body 46 has a packing gland cover 48 bolted thereto to maintain packing 50 in compression.

The valve stem 52 extends axially through the packing gland body and bushing 46 and is slideable relative to bushing 46. The packing 50 engages the valve stem 52 to provide a sealing relation between the bushing 46 and stem 52 but is maintained freely enough so that the valve stem 52 may readily reciprocate relative to the bushing 46.

The interior end of the valve stem 52 has threads 54 formed thereon. A valve plug 56 is threaded onto valve stem 52 and is securingly locked in place by a jam nut 58 which is threaded down against the valve plug 56. The valve plug 56 and the valve seat 36 are preferably formed of a corrosive and erosive resistant material. Stainless steel has been effectively utilized for the valve plug 56 and valve seat 36. The valve plug and valve seat might also be formed from mild steel faced with titanium nitrite or tungsten carbide. The plug and seat could also be formed of aluminum oxide.

The valve plug 56 has been shaped to most effectively minimize wear to the plug during slurry throttling applications. The valve plug 56 has a first conical surface 60 having a projected apex angle indicated at 62. The conical surface 60 mates with the conical surface 44 formed on valve seat 36 since both have the same included apex angle. A second conical surface 64 is formed on the valve plug 56 at the forward end thereof. Conical surface 64 has an apex angle 66 which is considerably less acute than the apex angle 62 of the first conical surface 60. The velocity of fluid movement into valve body 12 is determined by the position of valve plug 56 with respect to surface 44 and by the conical surface 60 of the valve plug. The contour of plug 56 also determines the angle of fluid movement during entry into the valve body 12. These factors are applied by those skilled in the art to control wear patterns by preferred amounts.

The valve stem 52 extends outwardly through the packing gland and bushing 46 and rear wall 16. A motor mounting bracket 68 (best seen in FIGURE 1) is secured to the valve body and extends rearwardly therefrom. A valve stem extension 70 rigidly secured to the valve stem 52 extends through the motor mounting bracket 68 and is supported thereby. A pneumatic or hydraulic cylinder motor (not shown) may be secured to motor mounting bracket 68 and its piston (not shown) may be secured to valve stem extension 70 to reciprocate the valve stem relative to the valve body 12 as required.

Formed at the lower portion of valve body front wall 14 is a valve purge port 72 which is normally sealingly closed by a pipe plug 74. If it becomes necessary to work on the interior of the valve body 12, such as to change the valve plug 56 or valve seat 36, the interior of the valve body 12 may be purged by removing the valve plug 74 to open the valve body purge port 72. The valve body 12 is also equipped with hangers 76 which are welded thereto and which may be utilized to facilitate positioning of the valve body in the pipeline and which may also be utilized to secure the valve body in the line.

It will be seen from the foregoing description that the cube-like valve body 12 is substantially enlarged as compared to the diameter of the inlet port 32 and outlet port 34 which are substantially the same size as the interior of the pipeline to which the valve is connected. It has been determined that the interior of the valve body 12 should include a volume at least twice the volume of a length of pipeline equivalent to the length of the valve body 12. By so forming the valve body, erosion of the valve body due to high velocity flow of slurry through the pipeline is materially reduced. This may be readily seen by reference to FIGURE 2. As the high velocity slurry enters the inlet port 32, its flow is restricted between the valve seat 36 and the valve plug 56. As is well known physically, when the flow is restricted in volume, the flow velocity is materially increased. Accordingly, high velocity flow occurs between the valve plug 56 and the valve seat 36 and the slurry enters the valve body 12 at an increased velocity. However, upon entering the valve body at high velocity, the flow restriction is not maintained by the proximity of the valve body walls to the valve plug. Rather, the valve body walls are spaced at a relatively large distance from the valve plug so that the energy of the high velocity slurry may be dissipated before striking the interior walls of the valve body 12. Accordingly, the erosive effect of the high velocity slurry is substantially reduced over the effect of that slurry on conventional valves in which the valve body itself serves to help maintain the flow restriction and is thereby subjected to erosion.

As is readily apparent, the flow of the slurry through the valve 10 may be controlled by placing the valve plug in a desired relation to the valve seat 36. Since the valve stem 52 is reciprocable relative to the valve body 12, the restriction to flow may be minimized by moving the valve plug 56 to the left as viewed in FIGURE 2 so that the opening in valve seat 36 is substantially unrestricted. At the other extreme, flow may be shut off completely by moving the valve plug 56 to the right as viewed in FIGURE 2 until the conical surface 60 of valve plug 56 comes into contact with the conical surface 44 of valve seat 36. Ordinarily, however, the valve 10 will not be used to shut off the flow of slurry completely, but rather will be utilized as a throttling valve to regulate the rate of flow of the slurry. Accordingly, in practice, the valve plug 56 will assume positions between the extreme closed position obtained by moving the plug 56 to the right as viewed in FIGURE 2 and the extreme open position which would result if the plug 56 were moved to the extreme left as viewed in FIGURE 2.

A fluid motor (not shown) has been referred to as one useful means of moving valve stem 52 to regulate the position of valve plug 56 and thereby regulate the rate of flow through valve 10. It will be appreciated that any suitable manual or automatic positioning means may be utilized to effect proper movement of valve stem 52.

According to the provisions of the patent statues, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:

A throttling valve for controlling a high velocity liquid slurry carrying entrained solid particles moving through a pipeline and comprising a valve body having a cylindrical sidewall defining a chamber and providing inlet and outlet openings into the chamber connectable to the pipeline a removable valve seat in the valve body having a frustoconical seating surface facing inwardly adjacent the inlet opening, said chamber characterized by having a cross-sectional area at least twice the minimum cross-sectional area of said valve seat so that the entrained particles undergo a marked reduction in velocity upon entering the valve body, a removable valve element axially movable relative to said valve seat having a frustoconical metering surface joined by a second conical surface at the forward end thereof, the frustoconical metering surface defining a controllable cross-section metering orifice with said seating surface and having a projected apex angle located axially a substantial distance beyond said valve seat so that the entrained particles enter the valve body at an acute angle relative to the valving axis to avoid direct impingment on the valve body sidewall and an access opening in the sidewall having a removable cover adapted to sealably close the access opening, said valve seat and valve element each being replaceable through said access opening.

References Cited by the Examiner

UNITED STATES PATENTS

| | | | |
|---|---|---|---|
| 272,684 | 2/1883 | Hall | 137—592 |
| 1,645,601 | 10/1927 | Lee | 251—127 XR |
| 1,911,905 | 5/1933 | Knowlton | 251—122 X |
| 1,919,232 | 7/1933 | Lee | 251—127 XR |
| 2,030,771 | 2/1936 | Still | 137—592 |
| 2,219,324 | 10/1940 | Lee | 251—123 |
| 2,644,820 | 7/1953 | Gresham | 251—368 X |
| 2,645,452 | 7/1953 | Lucas | 251—368 X |
| 2,665,712 | 1/1954 | Pratt | 251—367 X |
| 2,734,529 | 2/1956 | Harrison | 251—368 X |
| 2,772,695 | 12/1956 | Harrison | 251—368 X |
| 2,777,675 | 1/1957 | Stelzer | 251—144 X |
| 2,792,845 | 5/1957 | Atherton | 137—375 |
| 2,807,421 | 9/1957 | Carlson | 251—360 |
| 2,840,337 | 6/1958 | Sasserson | 251—363 X |

FOREIGN PATENTS 832,469   7/1938   France.

M. CARY NELSON, *Primary Examiner.*